United States Patent [19]

Hoh et al.

[11] 4,352,786
[45] Oct. 5, 1982

[54] TREATMENT OF COPPER REFINERY ANODE SLIME

[75] Inventors: Ying-Chu Hoh, Lung-Tan; Bao-Dein Lee, Taipei; Tieh Ma, Taipei; Wen-Shou Chuang, Taipei; Wei-Ko Wang, Lung-Tan, all of Taiwan

[73] Assignee: Institute of Nuclear Energy Research, Taiwan

[21] Appl. No.: 237,770

[22] Filed: Feb. 24, 1981

[51] Int. Cl.³ .................................................. C01G 21/02
[52] U.S. Cl. .................................. 423/98; 23/305 R; 204/DIG. 13
[58] Field of Search .................................. 423/92, 98; 204/DIG. 13

[56] References Cited

U.S. PATENT DOCUMENTS

| | | | |
|---|---|---|---|
| 879,080 | 2/1908 | Butters | 75/101 R |
| 918,647 | 4/1909 | Betts | 423/98 |
| 1,148,062 | 7/1915 | Tucker | 423/98 |
| 1,916,302 | 7/1933 | Curtin | 423/98 |
| 1,916,303 | 7/1933 | Curtin | 423/92 |
| 1,922,283 | 8/1933 | Dering | 23/304 |
| 2,076,738 | 3/1936 | Martin et al. | |
| 2,084,394 | 6/1937 | Heberlein . | |
| 2,111,112 | 3/1938 | Dudley . | |
| 2,328,089 | 8/1943 | Mulligan | 423/98 |
| 3,127,244 | 3/1964 | Elkin et al. | |
| 3,387,928 | 6/1968 | Doumas . | |
| 3,414,380 | 8/1965 | Mod . | |
| 3,419,355 | 12/1968 | Von Stein . | |
| 3,658,510 | 4/1972 | Hoffmann et al. | |
| 3,944,414 | 3/1976 | Yanagida et al. | |
| 3,996,046 | 12/1976 | Hoffmann et al. | |
| 4,002,544 | 1/1977 | Heimala et al. | |
| 4,076,605 | 2/1978 | Bilson . | |
| 4,094,668 | 6/1978 | Yannopoulos et al. | |
| 4,163,046 | 7/1979 | Subramanian et al. | |
| 4,220,628 | 9/1980 | Striffler et al. | 423/92 |
| 4,293,332 | 10/1981 | Wang et al. | |

OTHER PUBLICATIONS

Young, R. S. "Analysis Cu Refinery Slimes", Canadian Journal of Mining, Aug., 1973, p. 29.
Bovey, H. J. and Marks, S., "The Treatment of Zambian Copper Refinery Anode Simes", S. A. Chemical Processing: Apr.-May 1969.
Elkin, D. J. I., and Schloen, J. M. "Treatment of Electrolytic Copper Refinery Slimes", Journal of Metals, May 1950, Transactions AIME, vol. 188, pp. 764 and 766.
Evans, D. J. I., and Shoemaker, R. S. "International Symposium on Hydrometallurgy", 1973, pp. 95 and 96.

Primary Examiner—O. R. Vertiz
Assistant Examiner—Wayne A. Langel
Attorney, Agent, or Firm—Burns, Doane, Swecker & Mathis

[57] ABSTRACT

A process for the removal of lead content in anode slime by subjecting the latter to primary and secondary leach in a medium of an ammonium acetate solution at a temperature not exceeding 80° C. Whereby lead dissolution is maximized and other metals are minimized. Separate the leach solution from the undissolved slime residue, crystallize lead from the separated leach solution and recover the crystallized lead acetate.

13 Claims, 1 Drawing Figure

TREATMENT OF COPPER REFINERY ANODE SLIME

BACKGROUND OF THE INVENTION

This invention relates to a process for recovering lead from anode slime in order to upgrade the slime.

The presence of a large amount of lead in the slime makes the recovery of precious metals and other valuable metals from the slime more difficult. A variety of techniques have been utilized to recover the precious metals from the slime. None, however, have been commercially successful because of the large cost involved and the fact that it is difficult to recover the precious metals from the slime. One type of technique involves direct smelting of slimes. This is disadvantageous as excessive formation of matte and slag causes heavy recirculation of precious metals. Such techniques involve roasting to convert copper to copper oxide followed by leaching of the roasted slimes with sulfuric acid. The leached slimes are then melted down in a small reverberatory (dore) furnace in which the impurities are oxidized, leaving a dore bullion of the precious metals silver and gold. The dore is then pasted to recover the fine gold, fine silver and any other precious metal present in the original slime. This particular technique is, as noted, unsuitable because of the excessive formation of matte and slag.

A variety of other pyrometallurgical techniques combined with acid leachs and acid leach processes have also been attempted, but they are not suitable mainly because it has not been possible to initially remove substantially all of the lead from the slime. It has been found that the lead content of the slime cannot be removed by acid leaching. The presence of lead in the slime has greatly inhibited the known processes from recovering precious metals from slime.

SUMMARY OF THE INVENTION

The present invention provides a novel process for the removal of lead content of anode slimes in a rapid, convenient and economical manner, and, in its preferred embodiment, provides a hydrometallurgical process for upgrading slimes through the removal of most of the lead content in the anode slime.

Briefly stated, the present invention comprises a process for the removal of lead from anode slimes containing large amount of lead, comprising leaching the slimes with a solution of ammonium acetate at a temperature not exceeding 80° C. Whereby lead dissolution is maximized and the other metals are minimized. Separate the leach solution from the undissolved slime residue, crystallize lead from the separated leach solution and recover the crystallized lead acetate.

DETAILED DESCRIPTION

Figure 1:
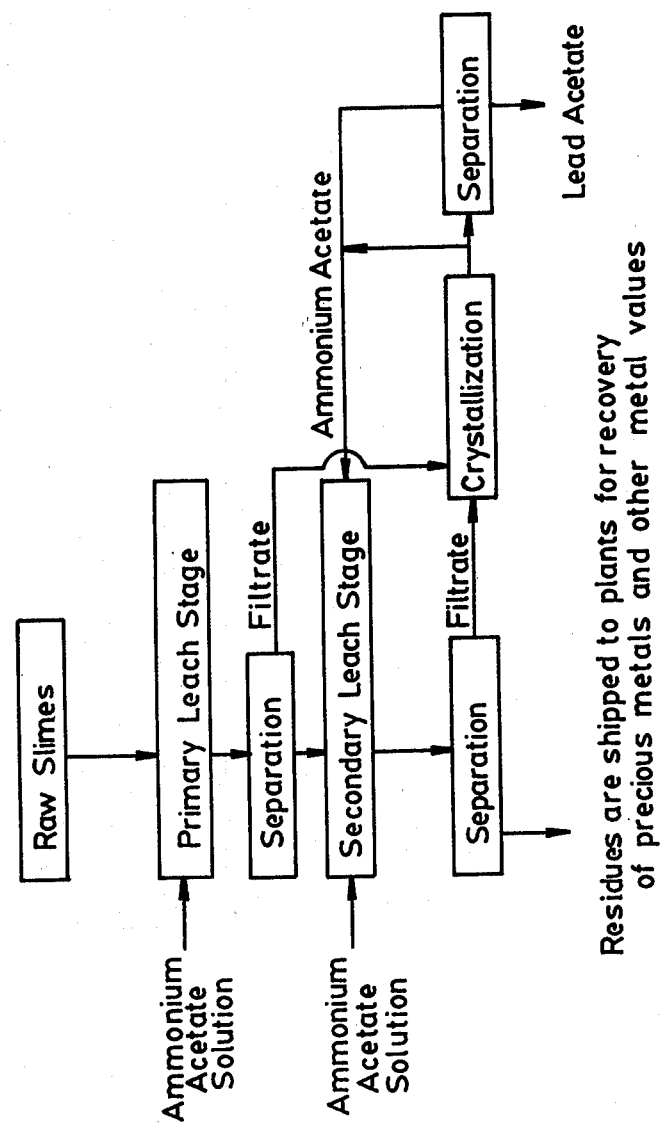
FIG. 1, is a flow sheet of the process according to the invention.

The process of the instant invention can be utilized to upgrade any type of anode slime or mud produced in electrolytic refining of copper. While the instant invention as hereinafter described in detail, is applicable to all such slimes, the optimum processing parameters for any particular slime can be determined by making test runs based on the particular composition of such slimes. Thus, for example, the initial leaching of a slime to remove lead, as discussed below, has need for a shorter period of time for those slimes containing low amount of lead, and correspondingly a longer leach time for those slimes containing high amounts of lead.

Leaching is effected under agitation in any conventional leaching vessel with an aqueous ammonium acetate solution with concentration from about 2 to 10 mole dm$^{-3}$. The particular amounts of ammonium acetate for use depends upon the concentration of lead in the slime be processed. For conventional slimes, amounts within the ranges noted are adequate for an effective leach.

It is desirable to maintain a temperature of about 40° C. through the leach and preferably not exceeding a temperature of about 60° C. and the leach is carried out for a time sufficient to leach substantially all of the lead from the slimes, that is to leave a lead content of preferably, no more than about 3% based on the weight of the slimes being leached. In general, this will take a total leach time of between 1 to 3 hours, again the particular time dependent upon the slime treated.

After leaching is completed, the leaching solution is separated from the undissolved slimes. This can be accomplished by any conventional technique, preferably by filtration. The leach slurry can be thickened prior to filtration or filtered directly from the leach. The solids are dried and processed for shipment to plants for recovery of precious metals and other metal values. Because the lead has been removed, the dried, processed anode slimes are acceptable for treatment in recovery plants for selenium, tellurium, tin, silver, gold and the like. The resultant clarified or filtered solution is purified by the removal of the lead content by crystallization. The crystallized lead acetate from this purification step is recovered through filtration, decantation or any solid-liquid separation techniques. The resultant clarified or filtered solution can be recycled back to the leaching step for reusing.

To more fully illustrate the process of the instant invention, the following examples are presented. It is to be understood, however, that the examples are given by way of illustrations and not limitations and that many changes may be effected without departure from the scope and spirit of the appended claims.

EXAMPLE I

Decopperized anode slime leaching experiment is carried out in a flask equipped with an agitator, a condenser, heating apparatus and a set of temperature indicator and controller.

The sample of anode slime in use possesse the following assay:

| Analysis of anode slime (845 grams) | wt % |
| --- | --- |
| Pb | 26.6 |
| Ag | 6.33 |
| Au | 0.067 |
| Cu | 0.188 |
| Se | 2.16 |
| Sn | 13.27 |
| moisture | 3.2 |

845 grams (wet basis) of decopperized anode slime together with stoichiometric amount of ammonium acetate are placed in the said flask heated for 1 to 4 hours at a temperature of 40° C. The percentage of extraction of lead is set forth in Table 1 below.

TABLE 1

| CH$_3$COONH$_4$ mole dm$^{-3}$ | Leaching Time, hours | | | |
|---|---|---|---|---|
| | 1 | 2 | 3 | 4 |
| | % Lead Extracted | | | |
| 2 | 17.62 | 19.11 | 19.95 | 20.19 |
| 3 | 25.04 | 26.00 | 25.67 | 27.53 |
| 4 | 33.07 | 34.82 | 36.17 | 37.50 |
| 5 | 43.86 | 44.95 | 45.13 | 45.98 |
| 6 | 49.93 | 52.10 | 51.09 | 50.25 |
| 7 | 51.14 | 51.07 | 52.27 | 52.36 |

EXAMPLE II

In this example a sample of decopperized anode slime having an assay similar to that set forth in Example 1 above was also leached in a manner similar to that set forth in Example I above. 6 mole dm$^{-3}$ of ammonium acetate was used as the leaching reagent. The percentage of extraction of lead is set forth in Table II below.

TABLE II

| Leaching Temp. C°. | Leaching Time, hours | | | |
|---|---|---|---|---|
| | 1 | 2 | 3 | 4 |
| | % Lead Extracted | | | |
| 20 | 41.71 | 42.50 | 42.79 | 43.00 |
| 40 | 48.67 | 51.60 | 50.57 | 50.01 |
| 55 | 37.25 | 38.87 | 36.95 | 36.50 |
| 75 | 34.75 | 35.60 | 33.67 | 33.17 |
| 100 | 27.68 | 26.82 | 25.63 | 25.00 |

EXAMPLE III

In this example a sample of decopperized anode slime having an assay similar to that set forth in Example I above was leached twice with ammonium acetate solution at 40° C. Each time a period of 2 hours was used for leach. The over-all percentage of extraction of lead is set forth in Table III below.

TABLE III

| Ammonium Acetate Concentration mole dm$^{-3}$ | % Lead Extracted |
|---|---|
| 2 | 34.74 |
| 3 | 48.31 |
| 4 | 67.39 |
| 5 | 79.20 |
| 6 | 95.23 |
| 7 | 93.13 |

EXAMPLE IV

In this example a sample of decopperized anode slime having an assay similar to that set forth in Example I above was leached twice with 6 mole dm$^{-3}$ of ammonium acetate solution at temperature in the range of from 20° C. to 100° C. Each time a period of 2 hours was used for leach. The over-all percentage of extraction of lead is set forth in Table IV below.

TABLE IV

| Leach Temp. C°. | % Lead Extracted |
|---|---|
| 20 | 71.42 |
| 40 | 94.67 |
| 55 | 76.06 |
| 75 | 68.64 |
| 100 | 57.32 |

The resulting pulp is filtered and the residue is dried and processed for shipment to plants for recovery of precious metals and other metals values. The analysis of residue follows:

| Analysis of Residue (424 grams) | wt % |
|---|---|
| Pb | 2.63 |
| Ag | 12.23 |
| Au | 0.13 |
| Cu | 0.326 |
| Se | 4.17 |
| Sn | 25.67 |
| moisture | 0.3 |

The resulting filtered solution at a leaching temperature of 40° C. was analyzed for metals for which the results are set forth below Analysis of ammonium acetate leach solution (6525 ml):

| Pb | mole dm$^{-3}$ | 0.1526 |
|---|---|---|
| Ag | ppm | 11.5 |
| Cu | ppm | 23.8 |
| Se | ppm | <0.5 |
| Sn | ppm | <4.0 |

The lead, silver, copper, selenium and tin containing solution is heated until the total volume is reduced to one-third of the initial volume and then cooled down. Meantime, lead acetate is crystallized out from the mother liquid. After filtration and drying, lead acetate with a purity of greater than 99.9% is obtained.

Although the present invention has been described in conjunction with proferred embodiments, it is to be understood that modifications and variations may be made without departing from the spirit and scope of the invention, as those skilled in the art will readily understand. Such modifications and variations are considered to be within the purview and scope of the invention as set forth in the appended claims.

What is claimed is:

1. A process for upgrading lead-containing anode slime produced in the electrolytic refining of copper and for the recovery of lead from such slime comprising:
    (a) contacting said anode slime in a primary leach stage with an ammonium acetate leach solution at an elevated temperature and for a period of time sufficient to provide a first leach solution which comprises a portion of the lead contained in said anode slime and separating a primary leach stage solution from undissolved anode slime residue; and
    (b) contacting said undissolved anode slime residue from the primary leach stage in a secondary leach stage with additional ammonium acetate leach solution at an elevated temperature and for a period of time sufficient to provide a second leach solution which comprises a portion of the lead contained in said anode slime and separating a secondary leach stage solution from undissolved anode slime residue, said undissolved anode slime residue subsequent to said primary and secondary leach stages comprising less than about 6 percent by weight of the lead originally contained in said anode slime.

2. The process of claim 1 wherein said primary and secondary leaching steps are conducted at a temperature between 20° C. and 100° C.

3. The process of claim 2 wherein said leaching steps are conducted at a temperature below about 80° C.

4. The process of claim 3 wherein said leaching steps are conducted at a temperature below about 60° C.

5. The process of claim 2 wherein said leaching steps are conducted at a temperature in excess of about 40° C.

6. The process of claim 1 wherein the concentration of ammonium acetate in said leach solutions is greater than 0.1 mole $dm^{-3}$.

7. The process of claim 6 wherein the concentration of ammonium acetate in said leaching solutions ranges from about 2 to 10 mole $dm^{-3}$.

8. The process of claim 1 wherein said primary and secondary leaching steps are conducted for at least 20 minutes.

9. The process of claim 8 wherein said primary and secondary leaching steps are conducted for 1 to 3 hours.

10. The process of claim 1 further comprising combining said primary and secondary leach stage solutions and removing lead therefrom as lead acetate by crystallization.

11. The process of claim 10 wherein said crystallization is conducted by heating said combined solutions to reduce the volume thereof by evaporation and subsequently cooling said solutions to crystallize said lead acetate.

12. The process of claim 1 wherein said primary leach solution comprises at least about 48 percent by weight of the lead contained in said anode slime.

13. The process of claim 1 wherein said secondary leach solution comprises at least about 46 percent by weight of the lead contained in said anode slime.

* * * * *